(12) United States Patent
Abe et al.

(10) Patent No.: US 7,111,910 B2
(45) Date of Patent: Sep. 26, 2006

(54) RIM HAVING A NON-UNIFORM THICKNESS

(75) Inventors: Kishiro Abe, Ayase (JP); Tsuneo Watanabe, Ayase (JP); Satoru Miyashita, Ebina (JP); Takenobu Hasegawa, Ayase (JP); Kenichi Inada, Machida (JP); Shojiro Yokomizo, Yokohama (JP); Shingo Tsukui, Toyohashi (JP); Katsuki Kato, Atsugi (JP); Morishi Kunou, Ayashi (JP); Katsunori Todoko, Ebina (JP); Kenji Hayashi, Ayase (JP); Nobuyuki Soma, Ayase (JP); Masaaki Hara, Ayase (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/190,187

(22) Filed: Jul. 27, 2005

(65) Prior Publication Data

US 2005/0253447 A1    Nov. 17, 2005

Related U.S. Application Data

(63) Continuation of application No. PCT/JP03/16019, filed on Dec. 15, 2003.

(30) Foreign Application Priority Data

| Jan. 28, 2003 | (JP) | ............................. 2003-018327 |
| Jan. 29, 2003 | (JP) | ............................. 2003-019694 |

(51) Int. Cl.
*B60B 21/00* (2006.01)
*B21K 1/38* (2006.01)

(52) U.S. Cl. ........................... 301/95.108; 301/95.109; 29/894.351

(58) Field of Classification Search ........... 301/95.101, 301/95.107–95.109; 29/894.35
See application file for complete search history.

(56) References Cited

U.S. PATENT DOCUMENTS

| 1,563,811 | A | * | 12/1925 | Wagenhorst | ........... 301/95.101 |
| 2,200,361 | A | * | 5/1940 | Hunt | ..................... 301/95.108 |
| 4,127,020 | A | | 11/1978 | Bosch | |
| 5,579,578 | A | | 12/1996 | Ashley, Jr. | |
| 5,832,609 | A | * | 11/1998 | Jansen | ................... 29/894.351 |
| 6,971,173 | B1 | * | 12/2005 | Guimard | ................ 29/894.354 |
| 2004/0124695 | A1 | * | 7/2004 | Guimard et al. | ....... 301/95.101 |

FOREIGN PATENT DOCUMENTS

JP          29-51         1/1954

(Continued)

*Primary Examiner*—Jason R. Bellinger
(74) *Attorney, Agent, or Firm*—DLA Piper Rudnick Gray Cary US LLP

(57) ABSTRACT

A rim material having a non-uniform thickness, a rim manufactured from the rim material, and a method for manufacturing the rim from the rim material. The rim material includes a first material portion which forms an axially curved portion of the rim after the rim material is formed to the rim and a second material portion which forms an intermediate portion between adjacent axially curved portions after the rim material is formed to the rim. The first material portion has a thick parallel-surface portion including opposite surfaces parallel to each other. The parallel-surface portion has a width greater than a maximum amount of an axial dislocation of the parallel-surface portion expected to occur when the parallel-surface portion is formed to a corresponding curved portion. The second material portion has a thickness varying portion. The thickness varying portion includes a surface having a configuration defined by a line including a straight line and/or a slightly curved line.

8 Claims, 5 Drawing Sheets

FOREIGN PATENT DOCUMENTS

| | | |
|---|---|---|
| JP | 57-066001 | 4/1982 |
| JP | 57-75297 A | 5/1982 |
| JP | 63-2801 B | 1/1988 |
| JP | 02-099401 | 4/1990 |
| JP | 2-123327 | 10/1990 |
| JP | 07-155882 | 6/1995 |
| JP | 8-91005 A | 4/1996 |
| WO | WO 96/25257 | 8/1996 |

* cited by examiner

RIM HAVING A NON-UNIFORM THICKNESS

This application is a continuation of International Application No. PCT/JP2003/016019, filed Dec. 15, 2003, which in turn, claims priority from Japanese Patent Applications JP2003-18327, filed Jan. 28, 2003, and JP2003-19694, filed Jan. 29, 2003, the entire contents of which are incorporated herein by reference.

FIELD OF THE INVENTION

The present invention relates to a rim and method for manufacturing the rim.

BACKGROUND OF THE INVENTION

For a wheel rim (for, e.g., a truck or bus), a material selected from at least two kinds of materials including a flat-plate material 1 as illustrated in FIG. 5 and a die steel 2 having a shaped configuration as illustrated in FIG. 6 can be used. Further, a material 3 having a non-uniform thickness (as illustrated in FIGS. 7 and 8) disclosed in Japanese Patent Publication No. HEI 8-91005 can be used.

Rim manufacturing processes from those materials are shown in FIGS. 9A, 9B, and 9C. In the manufacturing processes, as illustrated in FIG. 9A, the flat-plate material is formed to a rim configuration through a coiling step 4, a welding step 5, a trimming step 6, a flaring or expanding step, and a roll-forming step 7. As illustrated in FIG. 9C, the die steel is formed to a rim configuration through a coiling step, a welding step, and then an expanding step in a radial direction 8 (sizing), because the die steel has a cross-section close to a final configuration of the rim. As illustrated in FIG. 9B, a material having a non-uniform thickness of Publication 8-91005 may be formed to a rim configuration through the steps 4, 5, 7 and 8 (the trimming step 6 is not used).

Trimming of a welded burr conducted after rim-welding is executed as follows: In the case of a cylindrical material manufactured from the flat-plate material, as illustrated in FIGS. 10A and 10B, a welded burr is trimmed by moving a cutter 9 in an axial direction of the cylindrical material. In the case of an annular material manufactured from the die steel, as illustrated in FIGS. 11A and 11B, a burr of a welded portion W is trimmed by moving a cutter 10, which has the same configuration as that of a cross section of an annular material having a convex and/or concave configuration, in a circumferential direction of the annular material. In the case of an annular material manufactured from the material having a non-uniform thickness of Publication 8-91005, trimming is conducted in the same way as in the die steel.

The above-described conventional rim manufacturing processes have, for example, the following problems:

With cylindrical material manufactured from the flat-plate material, the cylindrical material has a uniform thickness except that a local thickness reduction occurs due to coiling and forming. Therefore, a thickness distribution in proportion to a stress distribution cannot be expected, and the thickness of the cylindrical material is uniformly thick in order to satisfy a required thickness of portions where rigidity and fatigue strength are most needed. As a result, the material is heavy and expensive, and it is difficult to obtain lightening and cost requirements.

Annular material manufactured from a die steel has a substantially constant thickness. Annular material has a large wave and a convex and/or concave configuration in the axial direction of the rim. Distortion and interference are likely to occur during the coiling, welding and forming steps. The appearance of the rim is also inferior Further, the welded portions can be trimmed only by moving the cutter in a circumferential direction of the rim as illustrated in FIG. 11A and FIG. 11B. Machining to a smooth surface is also difficult. As a result, the appearance and design quality is low, and additional machining for improving the appearance after trimming is usually required. Even if such additional machining is performed, the appearance is inferior, and cost control becomes difficult.

Japanese Patent Publication HEI 8-91005 (FIG. 7) proposed a method for manufacturing a rim from a material having various thicknesses at various portions of the material.

In Japanese Patent Publication HEI 8-91005, as illustrated in FIG. 7 and FIG. 8, thick portions of the material correspond to corner portions (axially curved portions) of the rim, so that the final configuration has a surface shaped in a convex arc. In the case of an arc-shaped surface, if a thick portion where maximum strength is required is offset in a width direction (i.e., an axial direction) of the rim, a required thickness cannot be assured at an objective portion. This means that a required strength cannot be assured at the objective portion, and a crack could be caused at the objective portion. To prevent this, an extra thickness must be added to the objective portion.

In addition, when a material is conveyed on conveyer rolls while being rolled, if the material has a flat surface and is thin, a front end portion of the conveyed material will be bent downward between the rolls due to the weight of the material, and thus, a smooth conveyance will be difficult.

Further, during the step of coiling, if the material has a flat surface, a pinch force caused by the pinch rolls in order to feed the material to coiling rolls is liable to be insufficient and problems may arise in feeding the material to the coiling rolls. If the clearance between the pinch rolls is decreased so that the material is forcibly fed to the coiling rolls, slippage is liable to occur between the coiling rolls and the material, and the material could be scuffed.

Further, since the surface of the thick portion of the curved portion of the rim has the configuration of an arc, as illustrated in FIG. 8, the surface of the curved portion includes a steep, inclined portion 23 which has a large inclination angle exceeding, for example, 30 degrees. In such a case, in the trimming step (6) of FIG. 9B, axial trimming is impossible, and only circumferential trimming can be used. However, as illustrated in FIGS. 12A, 12B, 12C and 12D, circumferential trimming is accompanied by the generation of an overlap 22, which is formed when a remaining material 21 of a removal material 20 is pushed by rolls in a succeeding step (for example, the roll-forming step). More particularly, when the welded portion W of the annular material is trimmed in the circumferential direction C as illustrated in FIG. 12A, by moving the cutter 10 as illustrated in FIG. 12B thereby removing the burr (removal material) 20, the remaining material 21 is generated as illustrated in FIG. 12C. The remaining portion 21 is turned to the overlap 22 when the remaining portion 21 is pushed by the roll during the step of roll-forming. If the overlap 22 is left as it is, it is likely to cause a crack due to a notch effect and the appearance will thus be inferior. Removing of the overlap 22 by machining will cause a large cost increase.

SUMMARY

In one embodiment, a rim having a non-uniform thickness, a method for manufacturing the rim, and a rim material for the rim is provided. In this embodiment, if a thick portion of the rim material is dislocated in an axial direction of an annular material during roll-forming of the annular material to the rim, the dislocation does not cause a decrease in strength of the rim.

In another embodiment, it is possible to trim a welded portion of an annular material in an axial direction of the annular material.

In another embodiment, it is possible to lighten the rim, but still maintain a required strength of the rim.

In another embodiment, it is possible to improve the appearance of the rim.

In one embodiment, a rim having a non-uniform thickness is manufactured from a rim material having a non-uniform thickness. The rim has a thickness varying in an axial direction of the rim. The rim material includes a first material portion which forms an axially curved portion of the rim after the rim material is formed to the rim and a second material portion which forms an intermediate portion between adjacent axially curved portions after the rim material is formed to the rim.

The first material portion has a parallel-surface portion including opposite surfaces parallel to each other and having a larger thickness than portions connected to the parallel-surface portion. The parallel-surface portion has a width greater than a maximum amount of an axial dislocation of the parallel-surface portion expected to occur when the parallel-surface portion is formed to a corresponding curved portion.

The second material portion has a thickness varying portion. The thickness varying portion includes a surface having a configuration defined by a line, which connects ends of parallel-surface portions located on opposite sides of the thickness varying portion. The line can be a straight line, a slightly curved line, a composite line of a straight line and an arc located at least one end of the straight line, or a composite line of a slightly curved line and an arc located at least one end of the slightly curved line, or any combination thereof.

In one embodiment, a method for manufacturing a rim having a non-uniform thickness is provided, which method includes the steps of:

producing a rim material having a non-uniform thickness;
coiling the rim material having a non-uniform thickness;
butt-welding opposite ends of the coiled rim material to form an annular material;
trimming a welded portion of the annular material;
flaring axially opposite end portions of the annular material; and
roll-forming the annular material flared at the axially opposite end portions to a rim configuration.

During the step of producing the rim material, the following rim material is produced:

The rim material includes a first material portion which forms an axially curved portion of the rim after the rim material is formed to the rim and a second material portion which forms an intermediate portion between adjacent axially curved portions after the rim material is formed to the rim.

The first material portion has a parallel-surface portion including opposite surfaces parallel to each other and having a larger thickness than portions connected to the parallel-surface portion. The parallel-surface portion has a width greater than a maximum amount of an axial dislocation of the parallel-surface portion expected to occur when the parallel-surface portion is formed to a corresponding curved portion.

The second material portion has a thickness varying portion.

In one embodiment, a rim material is provided for a rim having a non-uniform thickness, which rim material includes a first material portion which forms an axially curved portion of the rim after the rim material is formed to the rim and a second material portion which forms an intermediate portion between adjacent axially curved portions after the rim material is formed to the rim.

The first material portion has a parallel-surface portion including opposite surfaces parallel to each other and having a larger thickness than portions connected to the parallel-surface portion. The parallel-surface portion has a width greater than a maximum amount of an axial dislocation of the parallel-surface portion expected to occur when the parallel-surface portion is formed to a corresponding curved portion.

The second material portion has a thickness varying portion. The thickness varying portion includes a surface having a configuration defined by a line, which connects ends of parallel-surface portions located on opposite sides of the thickness varying portion. The line can be a straight line, a slightly curved line, a composite line of a straight line and an arc located at least one end of the straight line, or a composite line of a slightly curved line and an arc located at least one end of the slightly curved line, or any combination thereof.

In one embodiment, since the parallel-surface portion of the rim material has a width greater than the maximum amount of the axial dislocation of the parallel-surface portion expected to occur when the parallel-surface portion is formed to a corresponding curved portion, even if the rim material is dislocated in the axial direction, the parallel-surface portion is still located at the curved portion. As a result, the strength of the rim is assured.

Further, since the rim material includes a first material portion which forms an axially curved portion of the rim after the rim material is formed to the rim, and which has the parallel-surface portion, and a second material portion which forms an intermediate portion between adjacent axially curved portions after the rim material is formed to the rim and which has a thickness varying portion, a portion where a certain strength is required (e.g., the axially curved portion of the rim after the rim material is formed to the rim) can be made thicker, and a portion where the strength is too much (e.g., the portion between the adjacent curved portions) can be reduced in thickness, whereby lightening of the rim can be achieved, and material can be saved, but yet, a required strength can be maintained.

Further, in one embodiment, although the thickness is varied in the width direction of the material, the material is not as wavy in a cross section as material made from die steel. As a result, trimming the welded burr of the annular material is easy and the appearance quality can be improved.

In one embodiment, since the angle defined between the surface of the thickness varying portion and the surface of the surface-parallel portion is equal to or smaller than 25 degrees, it is possible to trim the butt-welded portion of the annular material in the axial direction of the annular material by moving a cutter having a relief angle equal to or larger than 25 degrees so as to follow a configuration of the material. As a result, problems of overlap generation and appearance quality degradation, which occur in a circumferential trimming, can be reduced.

BRIEF DESCRIPTION OF THE DRAWINGS

Embodiments of the present invention will now be explained with reference to the accompanying drawings, in which.

DETAILED DESCRIPTION OF EMBODIMENTS OF THE INVENTION

A rim having a non-uniform thickness, a method for manufacturing the rim having a non-uniform thickness, and a rim material for the rim having a non-uniform thickness will be explained with reference to FIGS. 1, 2, 3, 4A, 4B, 4C and 4D.

The rim 12 has a non-uniform thickness and can be used, for example, with a wheel for a bus and a truck. The rim 12 can also be used in wheels used in other types of vehicles.

The rim material 11 of the rim 12 includes a first material portion 13 which forms an axially curved portion (including axially curved portions A, B, C, D, E and F of FIG. 1) of the rim 12 having a non-uniform thickness after the rim material is formed to the rim 12 and a second material portion 14 which forms an intermediate portion between adjacent axially curved portions of the rim 12 after the rim material is formed to the rim 12. The curved portion is called an R portion. The rim 12 has a non-uniform thickness after being formed to the rim 12. Portion A is a curved portion between a first flange portion located at a first end of the rim 12 and a first bead seat portion connected to the first flange portion. Portion B is a curved portion between a side-wall portion located on the first side of the rim 12 and a drop portion. Portion C is a curved portion between a side-wall portion located on a second, opposite side of the rim 12 and the drop portion. Portion D is a curved portion located at a root of a hump portion, and portion E is a curved portion located at a top of the hump portion. Portion F is a curved portion between a second flange portion located at a second, opposite end of the rim 12 and a second bead seat portion connected to the second flange portion.

Figure 8:
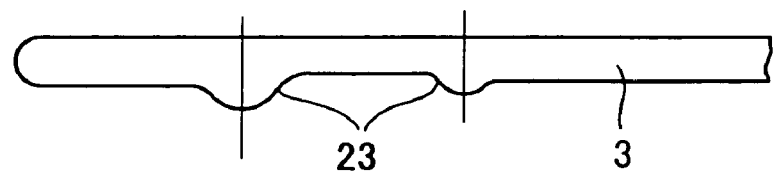
FIG. 8 is an enlarged cross-sectional view of a portion of the rim material made from a rim material having a non-uniform thickness disclosed in Japanese Patent Publication HEI 8-91005.

The first material portion 13 has a parallel-surface portion 13 (since the parallel-surface portion is the same portion as the first material portion 13, the parallel-surface portion is also denoted with reference numeral 13). The first material portion 13 includes opposite surfaces parallel to each other and having a larger thickness than portions connected to the parallel-surface portion 13. The parallel-surface portion 13 has a width greater than a maximum amount of an axial dislocation of the parallel-surface portions expected to occur when the parallel-surface portions are formed to corresponding curved portions A, B, C, D, E and F. Thicknesses of the parallel-surface portions may be different in thickness from each other. The conventional rim material 3 of FIG. 8 does not have the parallel-surface portion 13 of rim 12.

The second material portion 14 has a thickness varying portion 14 (since the thickness varying portion is the same portion as the second portion 14, the thickness varying portion is also denoted with reference numeral 14). The thickness varying portion 14 includes a surface having a configuration defined by a line, which connects ends (ends closer in the axial direction to the thickness varying portion 14) of parallel-surface portions located on axially opposite sides of the thickness varying portion 14. The line can be a straight line, a slightly curved line, a composite line of a straight line and/or an arc located on at least one axial end of the straight line, and/or a composite line of a slightly curved line and an arc located on at least one axial end of the slightly curved line.

The arc located at the axial end portion of the composite line is tangentially connected to the surface of the parallel-surface portion 13 and to the surface of the thickness varying portion 14 at the connecting portions. In other words, at the connecting portions, a tangent of the arc and a tangent of the surface of the parallel-surface portion 13 connected to the arc coincide with each other in direction, and a tangent of the arc and a tangent of the surface of the straight portion or the slightly curved portion of the parallel-surface portion 13 connected to the arc coincide with each other in direction.

The thickness of one thickness varying portion 14 can either gradually increase or gradually decrease from one axial end toward the other axial end of the one thickness varying portion 14. The thickness cannot gradually increase and gradually decrease in the one thickness varying portion 14. The direction of a gradual increase in one thickness varying portion 14 and the direction of a gradual decrease in another thickness varying portion 14 among a plurality of thickness varying portions 14 may differ from each other.

The parallel-surface portion 13 and the thickness varying portion 14 are formed when the rim material 11 is rolled.

If in the rim material 11, the surface of the parallel-surface portion 13 and the surface of the thickness varying portion 14 are connected via (a) the composite line including a straight line and an arc located on at least one axial end of the straight line or (b) the composite line including a slightly curved line and an arc located on at least one axial end of the slightly curved line, the roll is prevented from being injured by a corner of the rim material being roll-formed. Further, connection via an arc will weaken stress concentration in the rim material.

In one embodiment, the width of parallel-surface portion 13 can be, for example, 2–10 mm (equal to or greater than 2 mm and equal to or smaller than 10 mm). In this embodiment, if the width is smaller than 2 mm, it is difficult to absorb the dislocation in the width (axial) direction. If the width is greater than 10 mm, a length of the thickness varying portion 14 becomes small and the rate of variance in thickness of the thickness varying portion 14 becomes large, resulting in strength problems.

If the surfaces of the parallel-surface portions 13 located on axially opposite sides of the thickness varying portion 14 are connected via a straight line, the rim material has a surface or opposite surfaces including a corner and has a tapered surface.

Figure 1:
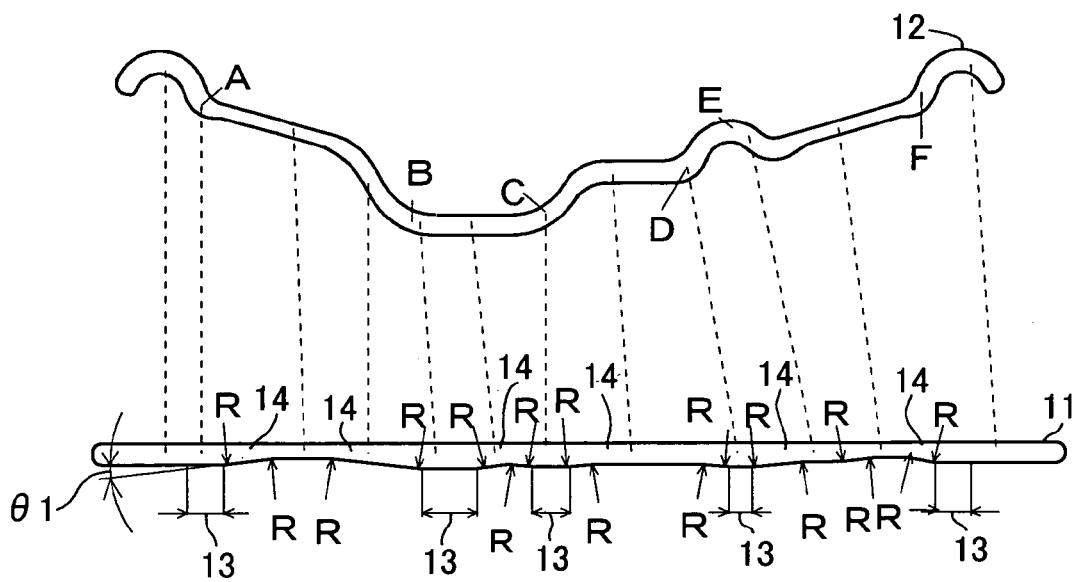
FIG. 1 is a cross-sectional view of a rim having a non-uniform thickness (shown in the upper half-portion of FIG. 1) and a rim material (shown in the lower half-portion of FIG. 1) (in a case of having a convex and concave surface at one surface thereof), illustrating correspondence between portions of the rim and portions of the rim material, according to one embodiment of the invention.

As illustrated in FIG. 1, the rim material 11 may have a first surface which is flat and a second, opposite surface which is convex and concave. When the rim material 11 has the configuration shown in FIG. 1, cost reductions of a welding electrode, stability of configuration in coiling the material, and accuracy of trimming can be achieved. Such configuration may be preferable during mass production.

Figure 2:
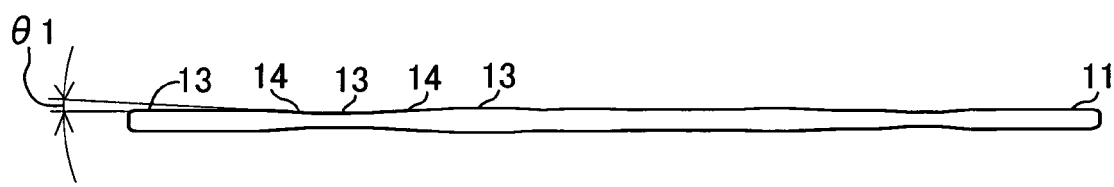
FIG. 2 is a cross-sectional view of a rim material (in a case of having a convex and concave surface at each of opposite surfaces thereof), according to one embodiment of the present invention.

As illustrated in FIG. 2, the rim material 11 may have a first surface and a second, opposite surface, both of which have convex and concave surfaces. The configuration illustrated in FIG. 2 is included in one embodiment of the present invention.

Figure 3:
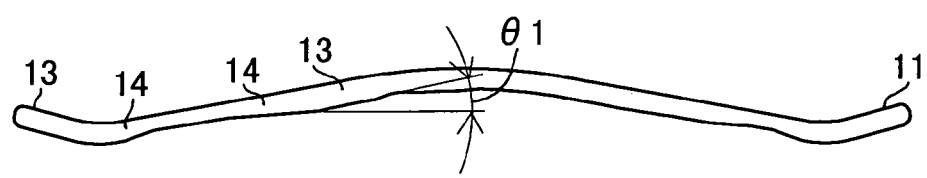
FIG. 3 is a cross-sectional view of a rim material (in a case of having not only a convex and concave surface at each of opposite surfaces thereof but also a wavy thickness-centerline), according to one embodiment of the present invention.
Figure 4A:
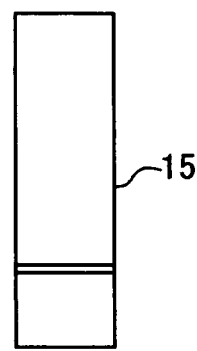
FIG. 4A is a front elevational view of a cutter used in axial trimming in manufacturing a rim having a non-uniform thickness, according to one embodiment of the present invention.
Figure 4B:
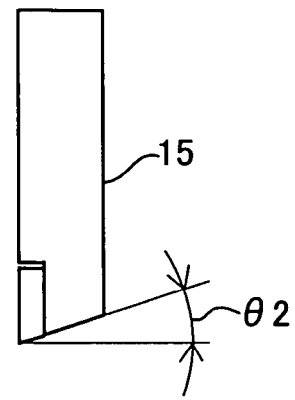
FIG. 4B is a side elevational view of the cutter used in axial trimming in manufacturing a rim having a non-uniform thickness, according to one embodiment of the present invention.
Figure 4C:
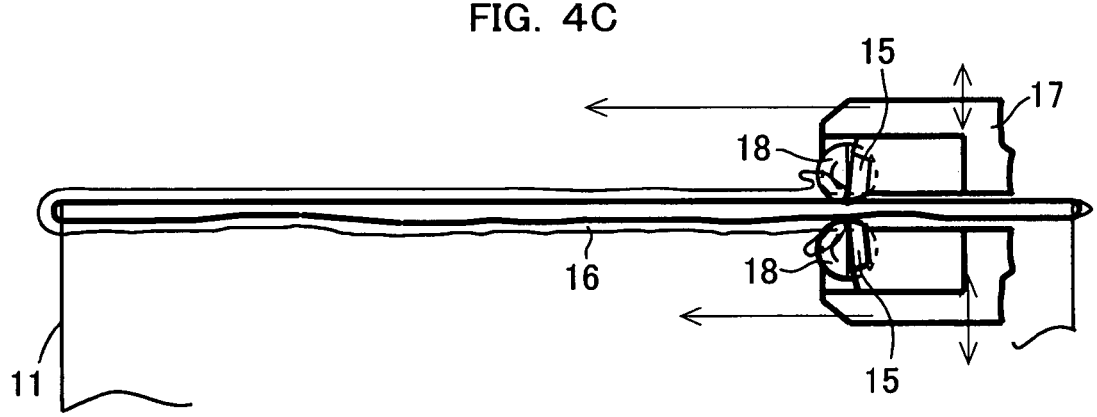
FIG. 4C is a cross-sectional view, taken in an axial direction of a rim material, of a trimming apparatus and an annular rim material used in axial trimming in the method for manufacturing a rim having a non-uniform thickness, according to one embodiment of the present invention.
Figure 4D:
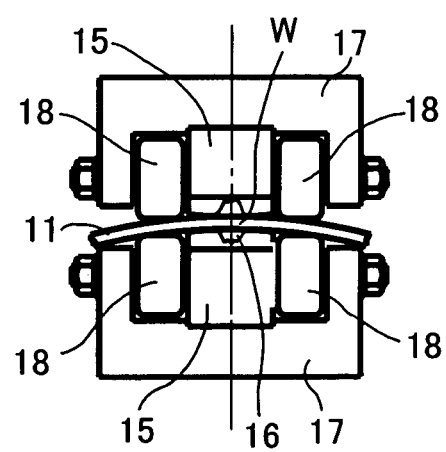
FIG. 4D is a cross-sectional view, taken in a direction perpendicular to the axial direction of the rim material, of the trimming apparatus and the annular rim material, according to one embodiment of the present invention.
Figure 5:
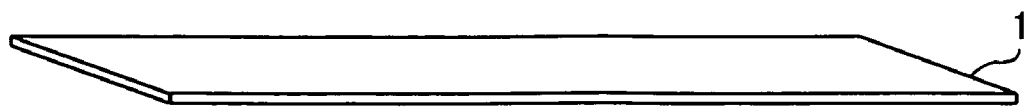
FIG. 5 is a perspective view of a conventional rim material made from a flat-plate.

As illustrated in FIG. 3, when the rim material 11 is being rolled or after the rim material has been rolled, the rim material is formed so that the thickness centerline is wavy so as to be smoothly convex and/or concave in a direction perpendicular to the axial direction of the rim. The configuration of the rim material 11 of FIG. 3 prevents a front end portion of the rim material 11 from being deformed when the rim material is conveyed between rolls.

The rim 12 may be manufactured using the above-described rim material 11. Therefore, the rim 12 varies in thickness in the axial direction of the rim as illustrated in FIG. 1. The curved portions A, B, C, D, E and F, where a certain strength is required, are located at the parallel-surface portions 13 on rim material 11, so that the portions requiring a certain strength have the required thicknesses. Since the parallel-surface portions 13 of the rim material 11 have a predetermined width (equal to or greater than 2 mm and equal to or smaller than 10 mm), even if the rim material 11 is dislocated in the width direction of the annular material while being roll-formed, the portions requiring a certain strength (the axially curved portions of the rim) are assured necessary thicknesses. Portions between the curved portions of the rim at the stage of the rim 12 after formed located at the thickness varying portions 14 at the stage of the rim material 11. An angle defined between the surface of the thickness varying portion 14 and a surface of the surface-parallel portion 13 connected to the thickness varying portion is equal to or smaller than 25 degrees, and more preferably, is equal to or smaller than 15 degrees. As a result, after the rim 12 is formed, the rim 12 does not have such a steep surface portion inclined relative to an axial direction of the rim as exceeds 30 degrees.

Figure 9A:
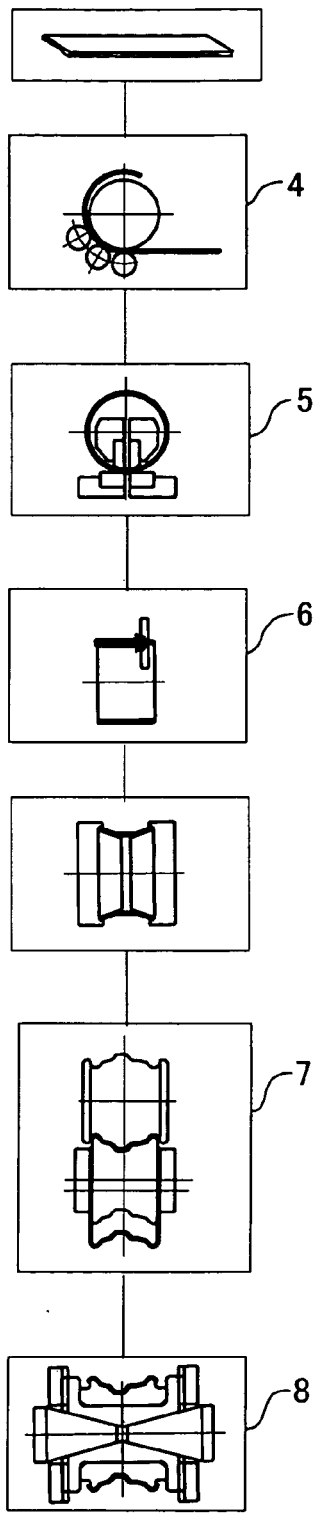
FIG. 9A is a process diagram for manufacturing a rim from rim material made from a flat-plate.
Figure 9B:
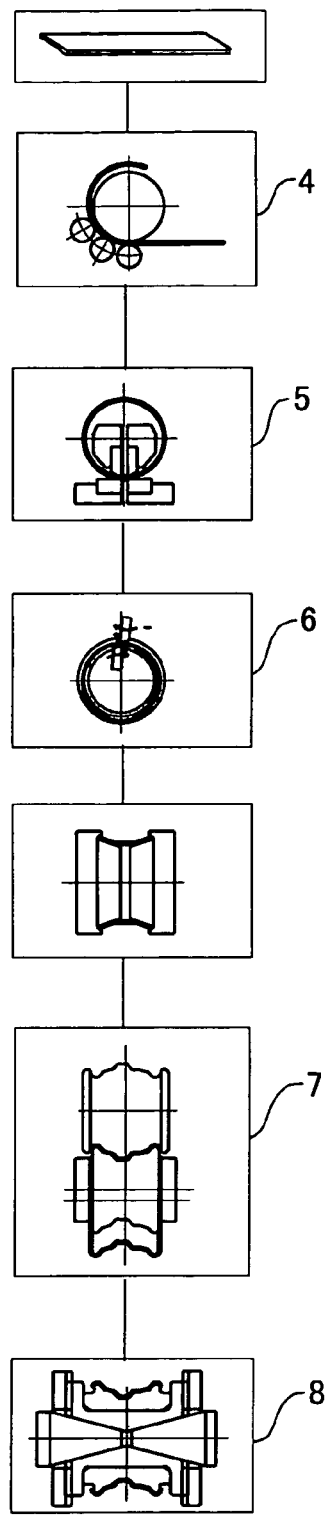
FIG. 9B is a process diagram of manufacturing a rim from rim material having a non-uniform thickness disclosed in Japanese Patent Publication HEI 8-91005.
Figure 9C:
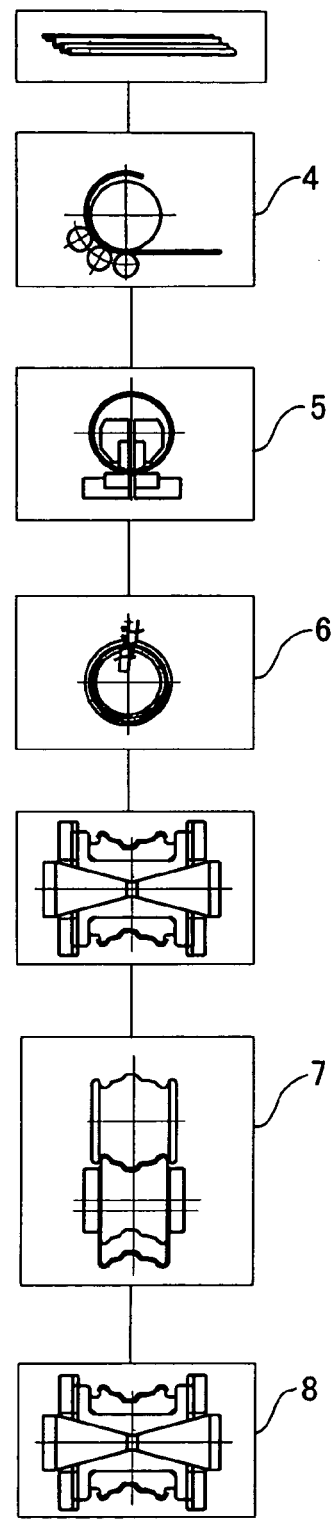
FIG. 9C is a process diagram for manufacturing a rim from rim material made from a die steel.
Figure 10A:
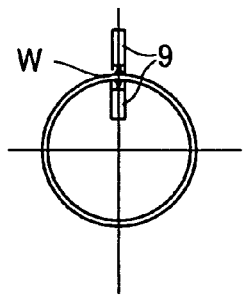
FIG. 10A is a front elevational view of a trimming apparatus and a cylindrical rim material in conventional axial trimming.
Figure 10B:
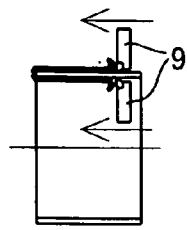
FIG. 10B is a cross-sectional view of the trimming apparatus and the cylindrical rim material of FIG. 10A.
Figure 11A:
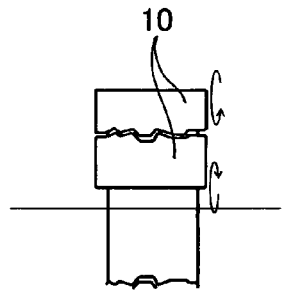
FIG. 11A is a side elevational view of a trimming apparatus and an annular rim material in conventional circumferential trimming.
Figure 11B:
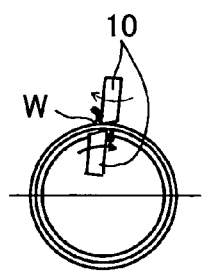
FIG. 11B is a front elevational view of trimming apparatus and the annular rim material of FIG. 11A.
Figure 12A:
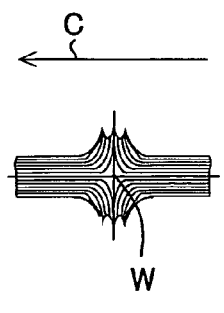
FIG. 12A is a cross-sectional view of an annular material in conventional axial trimming, taken in a circumferential direction of the material, before a welded portion of the rim material is trimmed (although the material is actually curved in the circumferential direction of the material, the material is shown straight)
Figure 12B:
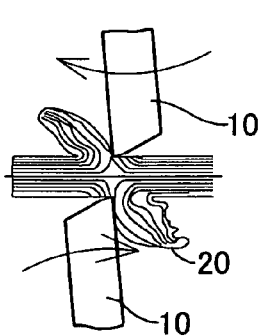
FIG. 12B is a cross-sectional view of the annular rim material and a cutter when the conventional circumferential trimming is being conducted.
Figure 12C:
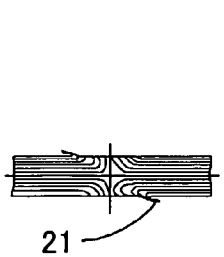
FIG. 12C is a cross-sectional view of a welded portion of the annular rim material having a non-removed remaining portion of a welded burr after the conventional circumferential trimming has been conducted.
Figure 12D:
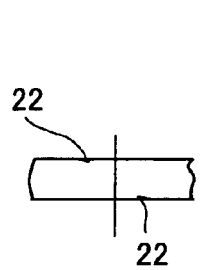
FIG. 12D is a cross-sectional view of a portion of the annular rim material including an overlap to which the remaining portion is changed by being pressed during roll-forming.

A method for manufacturing the rim 12 according to the present invention includes the steps of: producing the rim material 11 having a non-uniform thickness by rolling; coiling the rim material 11 having a non-uniform thickness (such as in step 4 of FIG. 9B); butt-welding opposite ends of the coiled rim material to form an annular material 11 (like step 5 of FIG. 9B); trimming a welded burr 16 of a welded portion W of the annular material 11 (FIG. 4C, FIG. 4D); flaring axially opposite end portions of the annular material (such as in the flaring step of FIG. 9B); and roll-forming the annular material flared at the axially opposite end portions to a rim having a rim configuration (such as in step 7 of FIG. 9B).

The steps of coiling, butt-welding the opposite ends of the coiled rim material, flaring the opposite ends of the annular material, and roll-forming the annular material to the rim correspond to the steps involved in manufacturing the rim in FIG. 9B, except the rim material producing step and the welded burr trimming step are not included. In the step of producing the rim material by rolling, any one of the rim materials 11 shown in FIGS. 1–3 is produced in one embodiment of the present invention. In the step of trimming, the circumferential trimming shown at step 6 of FIG. 9B is adopted in the conventional method, while the axial trimming shown in FIGS. 4A–4D can be used in the present invention. The axial trimming may be replaced by a circumferential trimming in one embodiment of the present invention.

In order to trim the welded portion in the axial direction at the stage of the annular rim material (manufactured by coiling the flat-plate rim material and butt-welding the opposite ends of the coiled rim material), as illustrated in FIGS. 4A, 4B, 4C and 4D, an axial trimming cutter 15 is moved so as to follow a configuration of the annular material 11 in the axial direction of the annular material so that a burr 16 of the welded portion of the annular material is trimmed. In order to let the cutter 15 follow the configuration of the annular material 11, the cutter 15 is supported by a housing 17 such that the cutter 15 is movable in an up-and-down direction relative to the annular material 11. The cutter 15 and the housing 17 are axially driven, letting the cutter 15 and the housing 17 move in the up-and-down direction by means of following rolls 18 provided at both sides of the cutter 15. Preferably, the cutters 15 are disposed not only outside the annular material but also inside the annular material, so that burrs 16 outside and inside the annular material are removed in one stroke of the cutter whereby an effective trimming is conducted.

A relief angle $\theta_2$ of the axial trimming cutter 15 should be 30 degrees at maximum, i.e., equal to or smaller than 30 degrees. An inclination angle $\theta_1$ of the thickness varying portion 14 of the rim material 11 (or the annular material after coiled) should be the relief angle $\theta_2$ of the axial trimming cutter 15. From the viewpoints of a life of the cutter and an appearance of the welded portion after trimmed, the inclination angle $\theta_1$ of the thickness varying portion 14 is preferable to be equal to or smaller than 25 degrees, and more preferably, equal to or smaller than 15 degrees.

In one embodiment, any rim material of FIGS. 1, 2 and 3 save material and produce a lighter rim compared with conventional rims made from a flat plate. The strength of the rim made from a flat plate is maintained by decreasing the thickness of a portion of the rim which has a strength that is unnecessarily large.

Any rim material 11 of FIGS. 1, 2 and 3 can assure a rim thickness required from strength and function even if an axial dislocation occurs in roll-forming, by providing a thick, parallel-surface portion 13 having a width length of 2–10 mm to the rim material.

Further, any rim material 11 of FIGS. 1, 2 and 3 can be a welded portion axially trim. This is possible because the inclination angle of the surface of the thickness varying portion 14 is equal to or smaller than 25 degrees, more preferably, equal to or smaller than 15 degrees, and the cutter 15 is moved in an up-and-down direction. As a result, the appearance of the welded portion of the rim is greatly improved, so that a step of removing an overlap and a step for final grinding are reduced or eliminate need for a grinder and a buff is reduced or eliminated, and thus cost reductions are possible.

Further, in the case where axial trimming is used, an overlap 22 formed from the un-removed, remaining welded burr is unlikely to be generated, so the fatigue strength of the rim is improved, resulting in further reduction of the rim thickness and further lightening of the rim.

Figure 6:
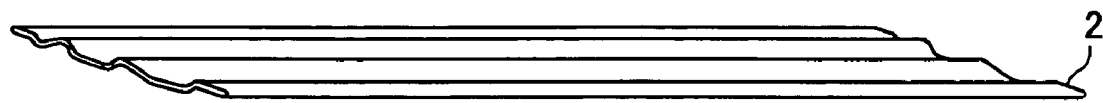
FIG. 6 is a perspective view of a conventional rim material made from a die steel.
Figure 7:
FIG. 7 is a perspective view of a conventional rim material made from a rim material having a non-uniform thickness.

As compared with the case of the die steel of FIG. 6, since the rim material has a substantially flat configuration, the roll for rolling the material can have a simple configuration, so that when the roll is abraded, grinding of the roll is easy and thus the manufacturing cost of the material is decreased.

Further, in one embodiment an apparatus for forming the rim can be obtained by modifying a portion of a conventional apparatus for manufacturing the rim from a flat plate, so that a large investment is not required.

The following additional effects and technical advantages can be obtained:

With the material of FIG. 1, since only one surface of the material is flat, in the step of welding during manufacturing the cylindrical material, a welding electrode having a flat tip surface can be used from the flat surface of the material toward the welding electrode, so that consumption of the electrode due to galvanic corrosion is suppressed whereby a cost reduction for using the electrode is achieved and the quality of welding is improved. Further, since only one surface of the material is flat, coiling the material is easy, trimming is easy, and a flat outside surface of the annular material is obtained.

With the material of FIG. 2, since both of the opposite surfaces are convex and concave, the convex and concave surfaces can be utilized for determining a positional relationship between forming die and the material so that dislocation of the material relative to the die is unlikely to occur and a dimensional accuracy of the formed material can be obtained.

With the material of FIG. 3, since the material has a wavy configuration, a rigidity in a thickness direction of the material is increased so that conveyance of the material during rolling of the material is stable, whereby a dimensional accuracy of the material is obtained and cost savings due to improved productivity is obtained.

In one embodiment, since the parallel-surface portion 13 of the rim material 11 has a width greater than a maximum amount of an axial dislocation of the parallel-surface portion expected to occur when the parallel-surface portion is formed to a corresponding curved portion, even if the rim material 11 is dislocated in the axial direction, the parallel-surface portion 13 is still located at the curved portion. As a result, the strength of the rim is assured.

Further, since the rim material includes (a) a first material portion which forms an axially curved portion of the rim after the rim material is formed to the rim and which has the parallel-surface portion 13 and (b) a second material portion which forms an intermediate portion between adjacent axially curved portions after the rim material is formed to the rim and which has a thickness varying portion 14, a portion where a strength is required is made thick, and a portion where a strength is too much can be reduced in thickness, whereby lightening of the rim and saving of material for the rim can be achieved, maintaining the necessary strength.

Further, though the thickness is varied in the width direction of the material, the material is not so much wavy in a cross section as the material made from die steel. As a result, trimming the welded burr of the annular material is easy and the appearance quality of the rim can be improved.

Further, in the case where the angle defined between the surface of the thickness varying portion and the surface of the surface-parallel portion is equal to or smaller than 25 degrees, it is possible to trim the butt-welded portion of the annular material in the axial direction of the annular material, by moving a cutter having a relief angle equal to or larger than 25 degrees so as to follow a configuration of the material. As a result, problems of overlap generation and appearance degradation, which occur in a circumferential trimming, can be resolved.

The invention claimed:

1. A rim material for a rim having a non-uniform thickness, including a first material portion which forms an axially curved portion of the rim after the rim material is formed to the rim and a second material portion which forms an intermediate portion between adjacent axially curved portions after the rim material is formed to the rim, the axially curved portion of the first material portion including subportions, wherein a first subportion [A] is a curved portion between a first flange portion located at a first end of the rim and a first bead seat portion connected to the first flange portion, a second subportion [B] is a curved portion between a side-wall portion located on the first side of the rim and a drop portion, a third subportion [C] is a curved portion between a side-wall portion located on a second, opposite side of the rim and the drop portion, a fourth subportion [D] is a curved portion located at a root of a hump portion, a fifth subportion [E] is a curved portion located at a top of the hump portion, and a sixth subportion [F] is a curved portion between a second flange portion located at [a] the second, opposite end of the rim and a second bead seat portion connected to the second flange portion;

wherein each of the subportions of the first material portion has a parallel-surface portion including opposite surfaces parallel to each other and having a larger thickness than portions connected to the parallel-surface portion, the parallel-surface portion having a width greater than a maximum amount of an axial dislocation of the parallel-surface portion expected to occur when the parallel-surface portion is formed to a corresponding curved portion, the parallel-surface portion having a width of equal to or greater than 2 mm and equal to or smaller than 10 mm in an axial direction of the rim; and the second material portion has a thickness varying portion.

2. The rim material of claim 1, wherein the thickness varying portion includes a surface having a configuration defined by a line, which connects ends of parallel-surface portions located on opposite sides of the thickness varying portion.

3. The rim material of claim 2, where the line is a straight line, a slightly curved line, a composite line of a straight line and an arc located on at least one end of the straight line, or a composite line of a slightly curved line and an arc located on at least one end of the slightly curved line, or any combination thereof.

4. The rim material of claim 1, wherein an angle defined between a surface of the thickness varying portion and a surface of the parallel-surface portion is equal to or less than 25 degrees.

5. A rim of non-uniform thickness manufactured from the rim material of non-uniform thickness of claim 1, the rim of non-uniform thickness varying in an axial direction of the rim.

6. The rim of claim 5, wherein the thickness varying portion includes a surface having a configuration defined by a line, which connects ends of parallel-surface portions located on opposite sides of the thickness varying portion.

7. The rim of claim 6, wherein the line is a straight line, a slightly curved line, a composite line of a straight line and an arc located on at least one end of the straight line, or a composite line of a slightly curved line and an arc located at least one end of the slightly curved line, or any combination thereof.

8. The rim of claim 5, wherein the angle defined between the surface of the thickness varying portion and the surface of the parallel-surface portion is equal to or smaller than 25 degrees.

* * * * *